US012266843B2

(12) United States Patent
Crouch et al.

(10) Patent No.: US 12,266,843 B2
(45) Date of Patent: Apr. 1, 2025

(54) WAVEGUIDE-TO-WAVEGUIDE POWER COMBINER/DIVIDER

(71) Applicant: Raytheon Company, Waltham, MA (US)

(72) Inventors: David D. Crouch, Eastvale, CA (US); David R. Sar, Corona, CA (US); Eachan Russell Landreth, Edgewood, NM (US)

(73) Assignee: Raytheon Company, Arlington, VA (US)

(*) Notice: Subject to any disclaimer, the term of this patent is extended or adjusted under 35 U.S.C. 154(b) by 315 days.

(21) Appl. No.: 17/660,217

(22) Filed: Apr. 22, 2022

(65) Prior Publication Data

US 2023/0344106 A1 Oct. 26, 2023

(51) Int. Cl.
*H01P 5/19* (2006.01)

(52) U.S. Cl.
CPC .................................... *H01P 5/19* (2013.01)

(58) Field of Classification Search
CPC .... H01P 5/12; H01P 1/022; H01P 5/19; H01P 11/001; H01P 5/103; H01P 5/16; H01P 1/027; H01P 1/042; H01P 1/065; H01P 1/16; H01P 1/195; H01P 11/002; H01P 3/003; H01P 3/06; H01P 3/12; H01P 3/081; H01P 5/107; H01P 5/182; H01Q 13/0225; H01Q 1/28; H01Q 13/02; H01Q 21/0037; H01Q 5/55; H01Q 21/065; H01Q 25/04
See application file for complete search history.

(56) References Cited

U.S. PATENT DOCUMENTS

| | | | | |
|---|---|---|---|---|
| 6,897,739 B2 * | 5/2005 | Chan | H01P 5/19 | |
| | | | 333/127 | |
| 9,666,927 B1 * | 5/2017 | Massman | H01P 5/19 | |
| 10,658,727 B1 * | 5/2020 | Foti | H01P 5/12 | |

OTHER PUBLICATIONS

Rebollar et al., "Design of a Compact Ka-Band Three-Way Power Divider;" Proceedings of IEEE Antennas and Propagation Society International Symposium and URSI National Radio Science Meeting, vol. 2; Jan. 1994; pp. 1074-1077; 4 Pages.

* cited by examiner

*Primary Examiner* — Lincoln D Donovan
*Assistant Examiner* — Tyler J Pereny

(57) ABSTRACT

A waveguide-to-waveguide power combiner/divider including a waveguide including a first opening at a first end of a first section of the waveguide in a first plane and n openings of n sections at n other ends of the waveguide, wherein n is a positive integer. At least one of the n sections is bent in at least one plane different from the plane of first section, and the first section and n sections each have at least two sides that are broader than at least two other sides; and n−1 walls within waveguide configured to divide a height of first section into n heights. Each of n sections has a height equal to one of the n heights, wherein the n−1 walls are located at a junction of the first section and the n sections and extend toward the first opening of the first section.

20 Claims, 10 Drawing Sheets

WAVEGUIDE-TO-WAVEGUIDE POWER COMBINER/DIVIDER

BACKGROUND

Power combiners and dividers have long been key elements in radio frequency (RF), microwave, and millimeter-wave systems. For high-power applications, a waveguide is the preferred transport medium as a waveguide may handle very high-power levels without risk of breakdown.

Waveguide power combiner/dividers are typically binary, comprising multiple layers of 2:1 combiner/divider stages. Furthermore, such devices are typically constructed from waveguide tee (e.g., T) junctions or magic tee junctions having limited bandwidths. In a T junction, first and second ports are at the ends of the top cross member of the T, respectively. The lower end of the vertical member of the T is a third port in the H-Plane. A magic T junction is a combination of E- and H-plane T junctions. The first three ports are at the base and ends of the cross member of an H-plane waveguide tee. The cross member is shared between the two tees. The fourth port is at the base of the E-plane tee, at the end of a waveguide arm perpendicular to the plane of the H-plane T.

SUMMARY

In accordance with the concepts described herein, example waveguide-to-waveguide power combiner/divider devices and methods provide a general combiner/divider architecture covering most, if not all, of the recommended waveguide bandwidths.

In accordance with the concepts described herein, example waveguide-to-waveguide power combiner/divider devices and methods realize both binary (e.g., 2:1, 4:1, etc.) and non-binary (e.g., 3:1 etc.) combiner/divider ratios to achieve non-power-of-two waveguide-to-waveguide combiner/divider devices.

In accordance with the concepts described herein, example waveguide-to-waveguide power combiner/divider devices and methods are based on tapered transitions from a full-height waveguide to a reduced-height waveguide.

In accordance with the concepts described herein, example waveguide-to-waveguide power combiner/divider devices and methods provide waveguide inputs that transition from separate full-height waveguides to stacked reduced-height waveguides via wideband transitions comprising E-plane bends and reduced-to-full height transitions.

In accordance with the concepts described herein, example waveguide-to-waveguide power combiner/divider devices and methods comprise heights of each reduced-height waveguide section that varies according to the position of the waveguide in a stack to equalize power division (i.e., insertion loss).

In accordance with the concepts described herein, example waveguide-to-waveguide power combiner/divider devices and methods provide a 3:1 combiner/divider having a height of a center reduced-height waveguide that is, in general, different from that of top or bottom waveguides (which by symmetry are of the same height).

In accordance with the concepts described herein, example waveguide-to-waveguide power combiner/divider devices and methods provide transitioning from a reduced-height waveguide stack to a full height waveguide, where walls separating adjacent waveguides are gradually eliminated using a tapered notch in order to reduce return loss at all ports and extend bandwidth.

In accordance with the concepts described herein, example waveguide-to-waveguide power combiner/divider devices and methods provide E-plane input waveguide stacks with E-plane bends and full-to-reduced height waveguide transitions.

In accordance with the concepts described herein, example N:1 waveguide-to-waveguide power combiner/divider devices and methods provide H-plane input waveguide fanout with E-plane bends and H-plane bends and full-to-reduced height waveguide transitions for any value of N (e.g., N≥5).

In accordance with the concepts described herein, example waveguide-to-waveguide power combiner/divider devices and methods provide transitions to leverage E-plane bend radii in performance optimization, resulting in a shorter transition with performance superior to that of a longer straight transition.

In accordance with the concepts described herein, example waveguide-to-waveguide power combiner/divider devices and methods provide aluminum waveguides.

In accordance with the concepts described herein, example waveguide-to-waveguide power combiner/divider devices and methods provide tapered notched septums in transitions from stacked reduced height waveguide to full-height waveguide to improve performance (e.g., improved input match, reduced insertion loss, etc.).

In accordance with the concepts described herein, example waveguide-to-waveguide power combiner/divider devices and methods provide H-plane waveguide fanout and vertical waveguide height transitions to improve return loss at all inputs while reducing transition length.

In accordance with the concepts described herein, example waveguide-to-waveguide power combiner/divider devices and methods provide a varying height of reduced waveguide sections to equalize insertion loss.

In accordance with the concepts described herein, example N:1 waveguide-to-waveguide power combiner/divider devices and methods are provided with fanouts that facilitate waveguide-to-waveguide power combiners/dividers with even or odd N for any value of N (e.g., N≥5).

In accordance with the concepts described herein, example waveguide-to-waveguide power combiner/divider devices and methods provide variable-length input waveguide sections optimized to equalize waveguide path lengths, providing wideband phase equalization (applicable to any relevant microwave band).

In accordance with the concepts described herein, example waveguide-to-waveguide power combiner/divider devices and methods provide fabrication techniques comprising brazing (e.g., aluminum dip brazing, hydrogen oven brazing, both methods used to fabricate W-band waveguide components) and additive manufacturing (e.g., AM-fabricated precursor for use in lost-wax casting, metal SLS followed by surface roughness mitigation).

In accordance with the concepts described herein, an example waveguide-to-waveguide power combiner/divider comprises a waveguide having a first opening at a first end of a first section of the waveguide in a first plane and n openings of n sections at n other ends of the waveguide, wherein n is a positive integer, wherein at least one of the n sections is bent in at least one plane different from the plane of the first section, and wherein the first section and the n sections each have at least two sides that are broader than at least two other sides; and n−1 walls within the waveguide configured to divide a height of the first section into n heights, wherein each of the n sections has a height equal to one of the n heights, wherein the n−1 walls are located at a junction of the first section and the n sections and extend toward the first opening of the first section.

In accordance with the concepts described herein, an example waveguide has a polygonal shape comprising one of a rectangular shape, a square shape, a hexagonal shape, an octagonal shape, and any other suitable polygonal shape.

In accordance with the concepts described herein, each of example n−1 walls has a tapered shape comprising one of a rectangular shape, a curved shape, a stair-stepped shape, and any other suitable geometric shape.

In accordance with the concepts described herein, an example tapered shape of each of the n−1 walls comprises one of tapering toward the first opening of the first section and tapering toward the n openings of the n sections.

In accordance with the concepts described herein, an example waveguide and the n−1 walls are each electrically conductive materials, wherein the electrically conductive materials comprise one of a metal and a non-conductive material having a conductive material deposited on interior surfaces of the waveguide.

In accordance with the concepts described herein, at least one of example n sections is bent at least once in an E-plane, at least once in an H-plane, or at least once into compound bends comprising at least one bend in both an E-plane and an H-plane.

In accordance with the concepts described herein, the example n heights are one of a same height and different heights.

In accordance with the concepts described herein, an example method of a waveguide-to-waveguide power combiner/divider comprises constructing a waveguide having a first opening at a first end of a first section of the waveguide in a first plane and n openings of n sections at n other ends of the waveguide, wherein n is a positive integer, wherein at least one of the n sections is bent in at least one plane different from the plane of the first section, and wherein the first section and the n sections each have at least two sides that are broader than at least two other sides; and inserting n−1 walls within the waveguide to divide a height of the first section into n heights, wherein each of the n sections has a height equal to one of the n heights, wherein the n−1 walls are located at a junction of the first section and the n sections and extend toward the first opening of the first section.

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which.

DETAILED DESCRIPTION

Example embodiment of the present disclosure provides waveguide-to-waveguide power combiner/divider devices and methods.

Figure 1:
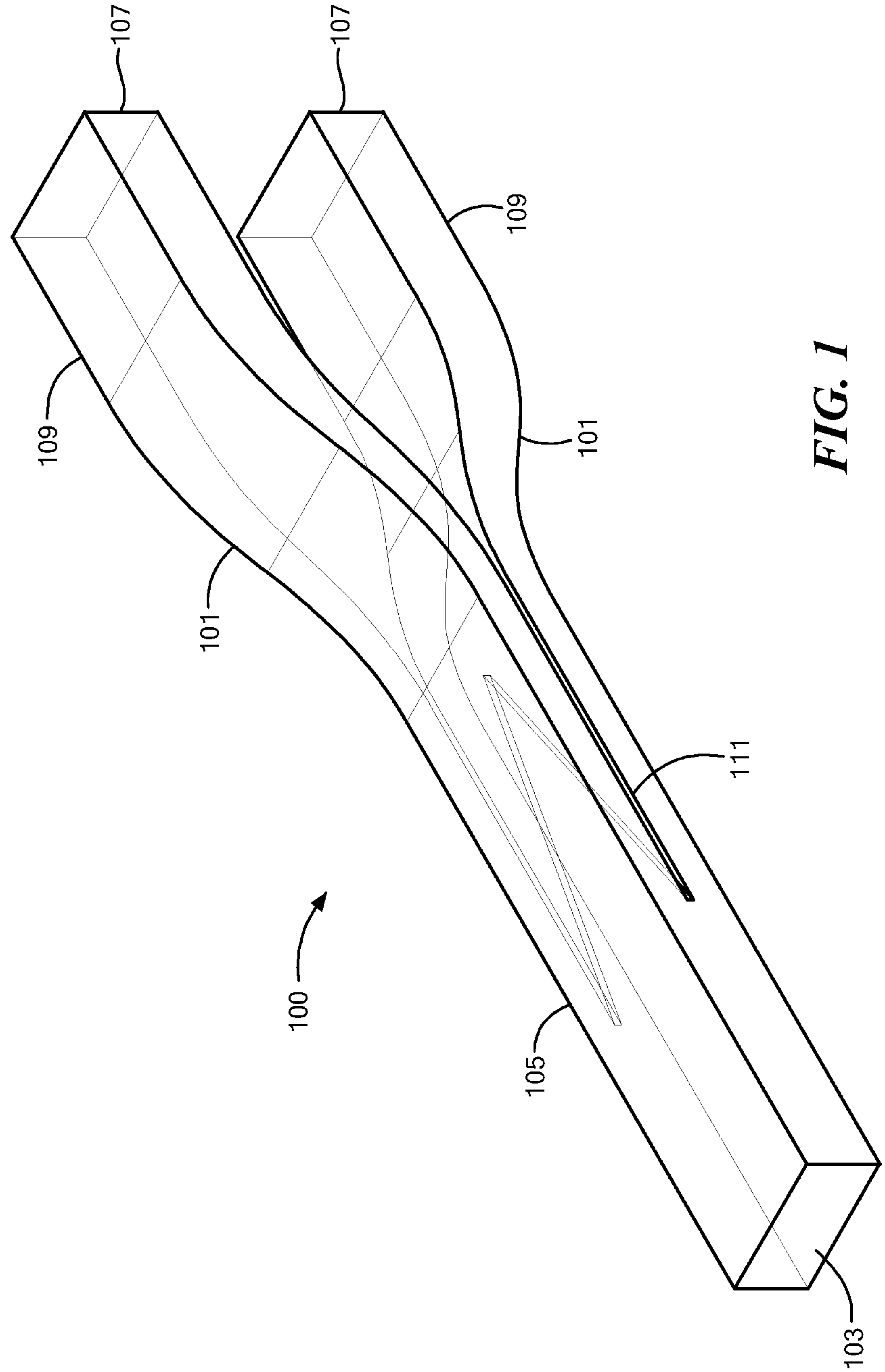
FIG. 1 is a perspective view of an example embodiment of a 2:1 waveguide-to-waveguide power combiner/divider with E-plane bends in accordance with the concepts described herein.
Figure 2:
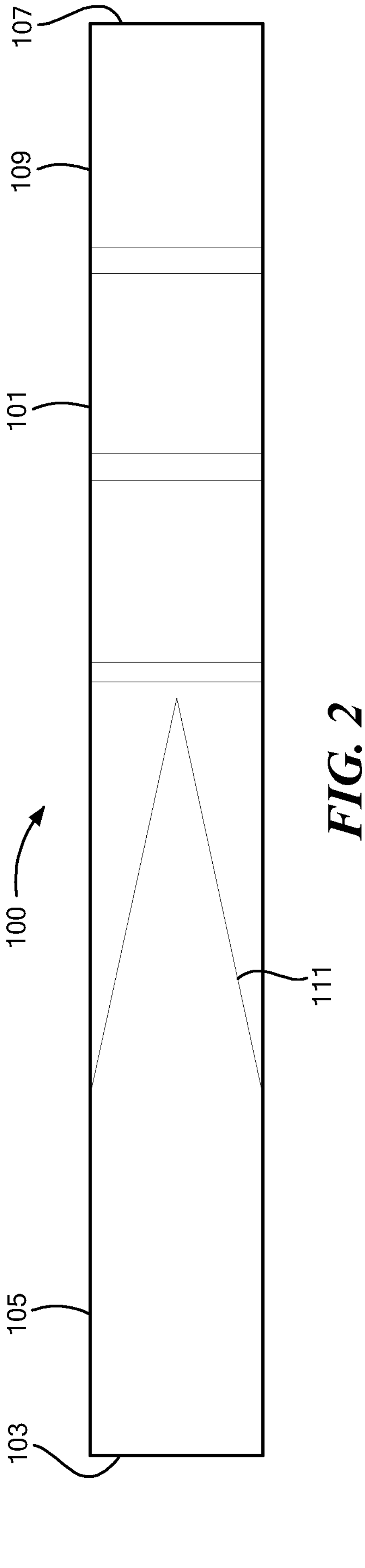
FIG. 2 is a top view of an example embodiment of a 2:1 waveguide-to-waveguide power combiner/divider with E-plane bends in accordance with the concepts described herein.
Figure 3:
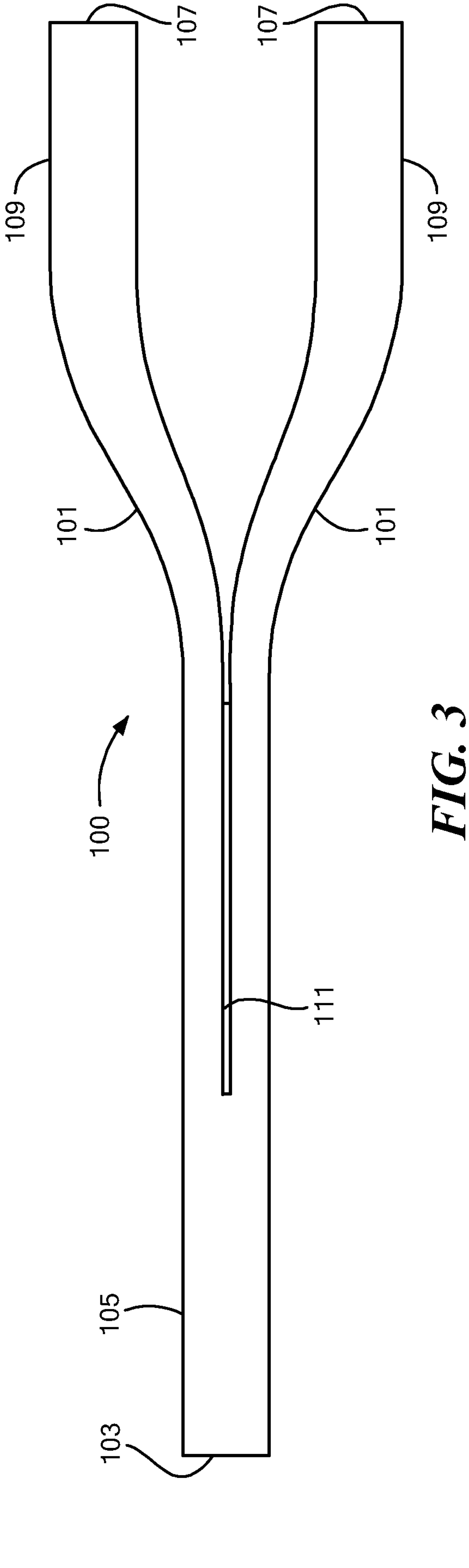
FIG. 3 is a side view of an example embodiment of a 2:1 waveguide-to-waveguide power combiner/divider with E-plane bends in accordance with the concepts described herein.

FIG. 1 is a perspective view, FIG. 2 is a top view and FIG. 3 is a side view of an example embodiment of a 2:1 waveguide-to-waveguide power combiner/divider 100 with E-plane bends 101 in accordance with the concepts described herein. In an example embodiment, the 2:1 waveguide-to-waveguide power combiner/divider 100 has a first opening 103 at a first end of a first section 105 of the 2:1 waveguide-to-waveguide power combiner/divider 100 in a first plane and two openings 107 of two sections 109 at two other ends of the 2:1 waveguide-to-waveguide power combiner/divider 100. However, the present disclosure is not limited to two sections 109. Any number of sections (e.g., n sections where n is a positive integer) may be used. At least one of the two sections 109 is bent 101 in at least one plane different from the plane of the first section 105 (e.g., an E-plane bend). The first section 105 and the two sections 109 each have at least two sides that are broader than at least two other sides. One wall 111 within the 2:1 waveguide-to-waveguide power combiner/divider 100 is configured to divide a height of the first section 105 into two heights, wherein each of the two sections 109 has a height equal to one of the two heights. The one wall 111 is located at a junction of the first section 105 and the two sections 109 and extend toward the first opening 103 of the first section 105. Example waveguide-to-waveguide power combiner/divider devices and methods provide a varying height of reduced waveguide sections to equalize insertion loss.

The length of the one wall 111 is set to a length that improves RF fidelity. Electromagnetic fields at the end of each tapered septum comprise a superposition of waveguide modes, of which only one can propagate (e.g., the fundamental $TE_{10}$ mode). Other modes decay exponentially with distance away from the end of the taper. The waveguide must be long enough that these modes are extinguished before reaching the open end, otherwise performance may be affected.

The 2:1 waveguide-to-waveguide power combiner/divider 100 shown in FIG. 1 is a rectangular, four-walled conductive container opened at two ends, where two opposing walls are broader than the other two opposing walls. However, the present disclosure is not limited thereto. The 2:1 waveguide-to-waveguide power combiner/divider 100 may be any suitable shape (e.g., hexagonal, octagonal, etc.), where there are more than two less-broad walls. The 2:1 waveguide-to-waveguide power combiner/divider 100 is conductive (e.g., metallic or a non-conductive material with a conductive metal deposited on interior surfaces of the waveguide). Metallic waveguides include copper, aluminum, brass, tin, etc.). Non-conductive materials include plastics, polymers, etc.). The length of the 2:1 waveguide-to-waveguide power combiner/divider 100 from the first opening 103 to the two openings 107 may be any suitable length to achieve a desired frequency and bandwidth (e.g., Hz, MHz, GHz, etc.).

In accordance with the concepts described herein, an example 2:1 waveguide-to-waveguide power combiner/divider 100 may have a polygonal shape comprising one of a rectangular shape, a square shape, a hexagonal shape, an octagonal shape, and any other suitable polygonal shape.

In accordance with the concepts described herein, the one wall 111 has a tapered shape comprising one of a rectangular shape, a curved shape, a stair-stepped shape, and any other suitable geometric shape.

In accordance with the concepts described herein, an example tapered shape of the one wall 111 comprises one of tapering toward the first opening 103 of the first section 105 and tapering toward the two openings 107 of the two sections 109.

In accordance with the concepts described herein, an example 2:1 waveguide-to-waveguide power combiner/divider 100 and the one wall 111 are each electrically conductive materials, wherein the electrically conductive materials comprise one of a metal and a non-conductive having a conductive material deposited on interior surfaces of the waveguide. In an example waveguide, a waveguide has a conductive metal deposited on interior surfaces to form conducting walls of the waveguide. The conducting walls of the waveguide shield interior RF fields from the material used to form the assembly, so any material (conductive or non-conductive) may be used. This is advantageous where weight is an issue and the waveguide does not need to support high average power operation, allowing use of a lightweight material with low thermal conductivity.

In accordance with the concepts described herein, at least one of example two sections 109 is bent 101 at least once in an E-plane. However, the present disclosure is not limited thereto. The bends may be bends in an H-plane or compound bends comprising at least one bend in both an E-plane and an H-plane.

In accordance with the concepts described herein, the example two heights are one of a same height and different heights.

Figure 4:
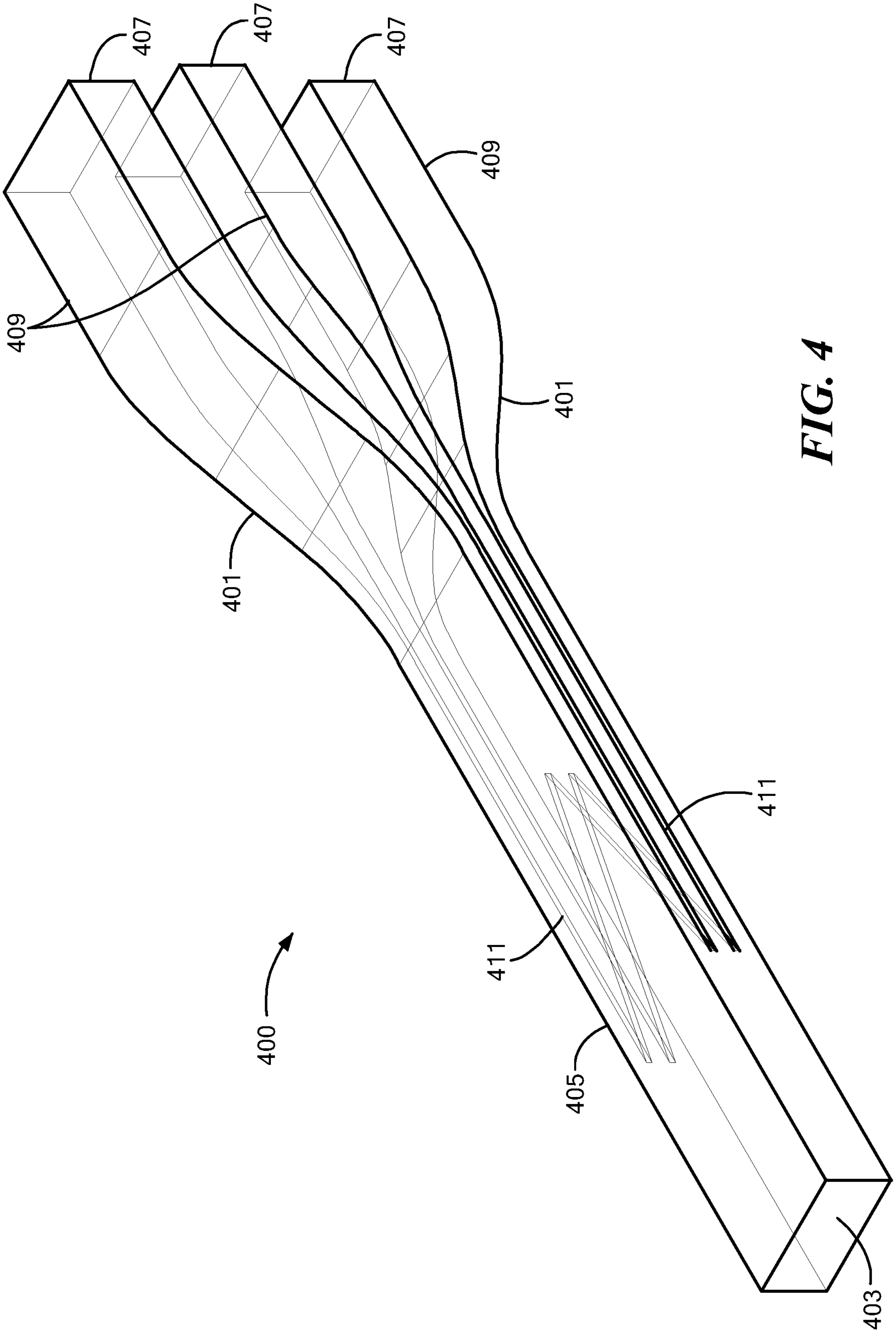
FIG. 4 is a perspective view of an example embodiment of a 3:1 waveguide-to-waveguide power combiner/divider with E-plane bends in accordance with the concepts described herein.
Figure 5:
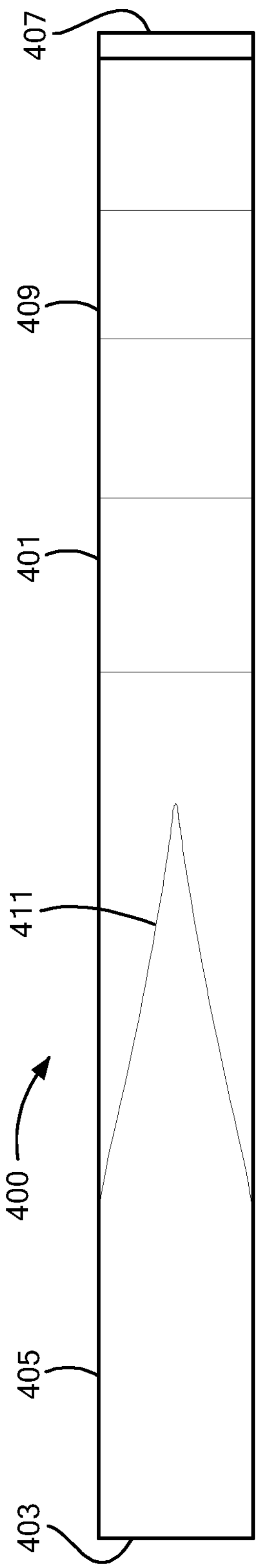
FIG. 5 is a top view of an example embodiment of a 3:1 waveguide-to-waveguide power combiner/divider with E-plane bends in accordance with the concepts described herein.
Figure 6:
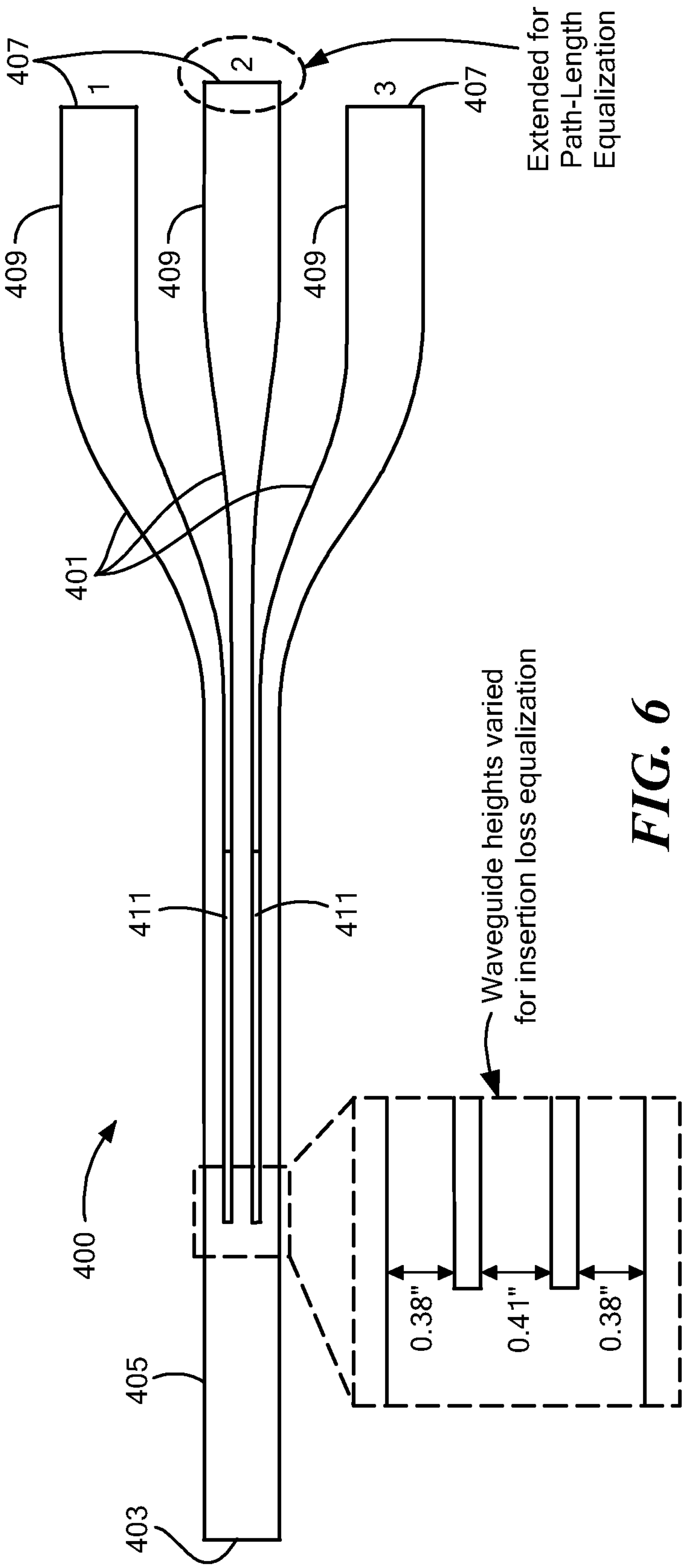
FIG. 6 is a side view of an example embodiment of a 3:1 waveguide-to-waveguide power combiner/divider with E-plane bends in accordance with the concepts described herein.

FIG. 4 is a perspective view, FIG. 5 is a top view, and FIG. 6 is a side view of an example embodiment of a 3:1 waveguide-to-waveguide power combiner/divider 400 with E-plane bends 401 in accordance with the concepts described herein. In an example embodiment, the 3:1 waveguide-to-waveguide power combiner/divider 400 has a first opening 403 at a first end of a first section 405 of the 3:1 waveguide-to-waveguide power combiner/divider 400 in a first plane and three openings 407 of three sections 409 at three other ends of the 3:1 waveguide-to-waveguide power combiner/divider 400. However, the present disclosure is not limited to three sections 409. Any number of sections (e.g., n sections where n is a positive integer) may be used. At least one of the three sections 409 is bent 401 in at least one plane different from the plane of the first section 405 (e.g., an E-plane bend). The first section 405 and the three sections 409 each have at least two sides that are broader than at least two other sides. Two walls 411 within the 3:1 waveguide-to-waveguide power combiner/divider 400 are configured to divide a height of the first section 405 into three heights, wherein each of the three sections 409 has a height equal to one of the three heights. The two walls 411 are located at a junction of the first section 405 and the three sections 409 and extend toward the first opening 403 of the first section 405.

The 3:1 waveguide-to-waveguide power combiner/divider 400 shown in FIG. 4 is a rectangular, four-walled conductive container opened at two ends, where two opposing walls are broader than the other two opposing walls. However, the present disclosure is not limited thereto. The 3:1 waveguide-to-waveguide power combiner/divider 400 may be any suitable shape (e.g., hexagonal, octagonal, etc.), where there are more than two less-broad walls. The 3:1 waveguide-to-waveguide power combiner/divider 400 is conductive (e.g., metallic or a non-conductive material with a conductive metal deposited on interior surfaces of the waveguide). Metallic waveguides include copper, aluminum, brass, tin, etc.). Non-conductive materials include plastics, polymers, etc.). The length of the 3:1 waveguide-to-waveguide power combiner/divider 400 from the first opening 403 to the three openings 407 may be any suitable length to achieve a desired frequency and bandwidth (e.g., Hz, MHz, GHz, etc.).

In accordance with the concepts described herein, an example 3:1 waveguide-to-waveguide power combiner/divider 400 may have a polygonal shape comprising one of a rectangular shape, a square shape, a hexagonal shape, an octagonal shape, and any other suitable polygonal shape.

In accordance with the concepts described herein, the two walls 411 each have a tapered shape comprising one of a rectangular shape, a curved shape, a stair-stepped shape, and any other suitable geometric shape.

In accordance with the concepts described herein, an example tapered shape of each of the two walls 411 comprises one of tapering toward the first opening 403 of the first section 405 and tapering toward the three openings 407 of the three sections 409.

In accordance with the concepts described herein, an example 3:1 waveguide-to-waveguide power combiner/divider 400 and the two walls 411 are each electrically conductive materials, wherein the electrically conductive materials comprise one of a metal and a non-conductive material having a conductive material deposited on interior surfaces of the waveguide. In an example waveguide, a waveguide has a conductive metal deposited on interior surfaces to form conducting walls of the waveguide. The conducting walls of the waveguide shield interior RF fields from the material used to form the assembly, so any material (conductive or non-conductive) may be used. This is advantageous where weight is an issue and the waveguide does not need to support high average power operation, allowing use of a lightweight material with low thermal conductivity.

In accordance with the concepts described herein, at least one of example three sections 409 is bent 401 at least once in an E-plane. However, the present disclosure is not limited thereto. The bends may be bends in an H-plane or compound bends comprising at least one bend in both an E-plane and an H-plane.

In accordance with the concepts described herein, the example three heights are one of a same height and different heights (e.g., the heights may be identical to each other, unique from each other, or any combination there between).

In an example embodiment, the three sections 409 may have different lengths in order to equalize the pathlengths or for other purposes.

As shown in FIG. 6, the three heights to which the height of the first section 405 is divided by the two walls 411 may be 0.38 inches, 0.41 inches, and 0.38 inches, respectively, in order to equalize insertion loss. However, the present disclosure is not limited thereto.

Figure 7:
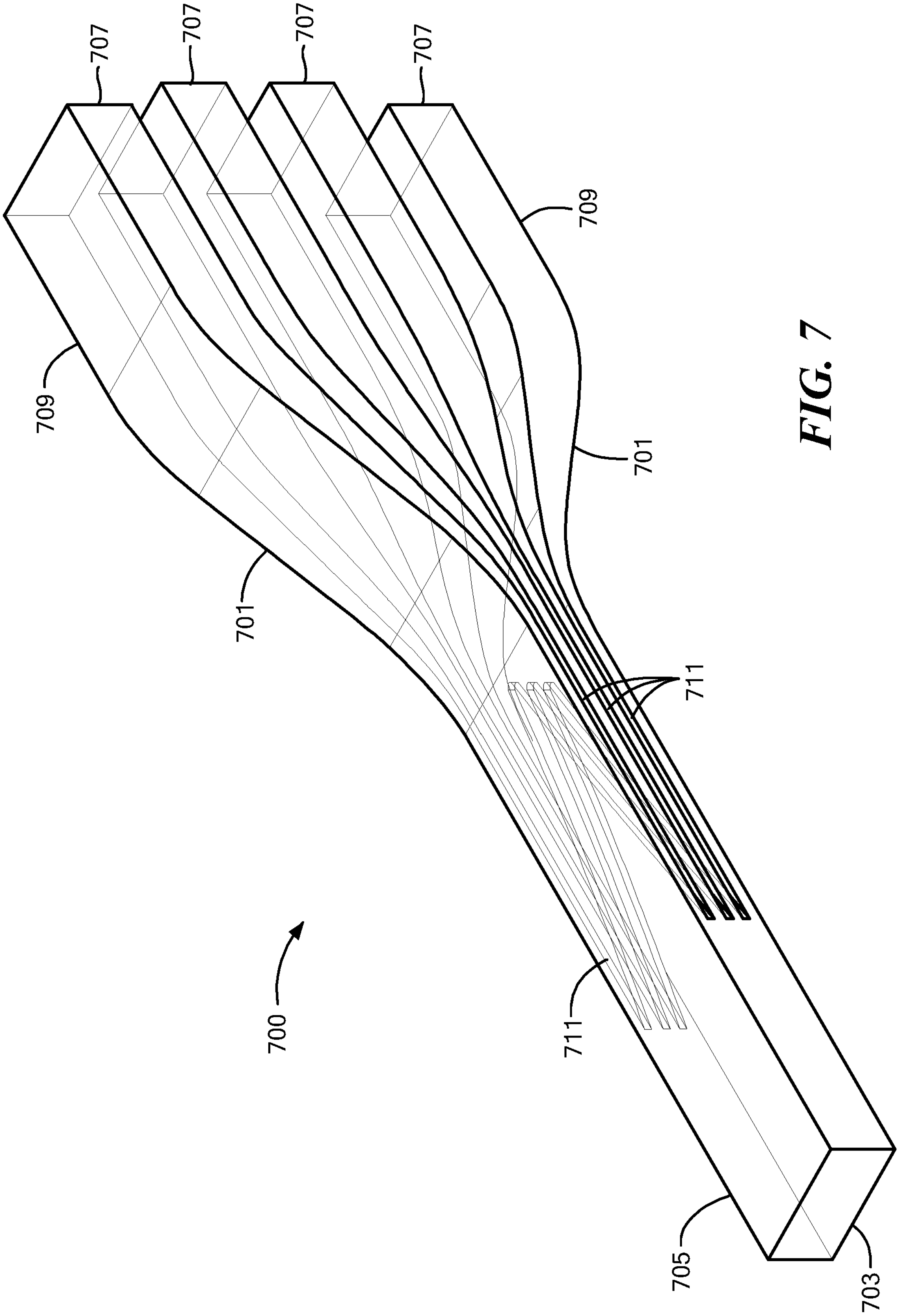
FIG. 7 is a perspective view of an example embodiment of a 4:1 waveguide-to-waveguide power combiner/divider with E-plane bends in accordance with the concepts described herein.

FIG. 7 is a perspective view of an example embodiment of a 4:1 waveguide-to-waveguide power combiner/divider 700 with E-plane bends 701 in accordance with the concepts described herein. In an example embodiment, the 4:1 waveguide-to-waveguide power combiner/divider 700 has a first opening 703 at a first end of a first section 705 of the 4:1 waveguide-to-waveguide power combiner/divider 700 in a first plane and three openings 707 of four sections 709 at four other ends of the 4:1 waveguide-to-waveguide power combiner/divider 700. However, the present disclosure is not limited to four sections 709. Any number of sections (e.g., n sections where n is a positive integer) may be used. At least one of the four sections 709 is bent 701 in at least one plane different from the plane of the first section 705 (e.g., an E-plane bend). The first section 705 and the four sections 709 each have at least two sides that are broader than at least two other sides. Three walls 711 within the 4:1 waveguide-to-waveguide power combiner/divider 700 are configured to divide a height of the first section 705 into four heights, wherein each of the four sections 709 has a height equal to one of the four heights. The three walls 711 are located at a junction of the first section 705 and the four sections 709 and extend toward the first opening 703 of the first section 705.

The 4:1 waveguide-to-waveguide power combiner/divider 400 shown in FIG. 7 is a rectangular, four-walled conductive container opened at two ends, where two opposing walls are broader than the other two opposing walls. However, the present disclosure is not limited thereto. The 4:1 waveguide-to-waveguide power combiner/divider 700 may be any suitable shape (e.g., hexagonal, octagonal, etc.), where there are more than two less-broad walls. The 4:1 waveguide-to-waveguide power combiner/divider 700 is conductive (e.g., metallic or a non-conductive material with a conductive metal deposited on interior surfaces of the waveguide). Metallic waveguides include copper, aluminum, brass, tin, etc.). Non-conductive materials include plastics, polymers, etc.). The length of the 4:1 waveguide-to-waveguide power combiner/divider 700 from the first opening 703 to the four openings 707 may be any suitable length to achieve a desired frequency and bandwidth (e.g., Hz, MHz, GHz, etc.).

In accordance with the concepts described herein, an example 4:1 waveguide-to-waveguide power combiner/divider 700 may have a polygonal shape comprising one of a rectangular shape, a square shape, a hexagonal shape, an octagonal shape, and any other suitable polygonal shape.

In accordance with the concepts described herein, the three walls 711 each have a tapered shape comprising one of a rectangular shape, a curved shape, a stair-stepped shape, and any other suitable geometric shape.

In accordance with the concepts described herein, an example tapered shape of each of the three walls 711 comprises one of tapering toward the first opening 703 of the first section 705 and tapering toward the four openings 707 of the four sections 709.

In accordance with the concepts described herein, an example 4:1 waveguide-to-waveguide power combiner/divider 700 and the three walls 711 are each electrically conductive materials, wherein the electrically conductive materials comprise one of a metal and a non-conductive material having a conductive material deposited on interior surfaces of the waveguide. In an example waveguide, a waveguide has a conductive metal deposited on interior surfaces to form conducting walls of the waveguide. The conducting walls of the waveguide shield interior RF fields from the material used to form the assembly, so any material (conductive or non-conductive) may be used. This is advantageous where weight is an issue and the waveguide does not need to support high average power operation, allowing use of a lightweight material with low thermal conductivity.

In accordance with the concepts described herein, at least one of example four sections 709 is bent 701 at least once in an E-plane. However, the present disclosure is not limited thereto. The bends may be bends in an H-plane or compound bends comprising at least one bend in both an E-plane and an H-plane.

In accordance with the concepts described herein, the example four heights are one of a same height and different heights (e.g., the heights may be identical to each other, unique from each other, or any combination there between).

Figure 8:
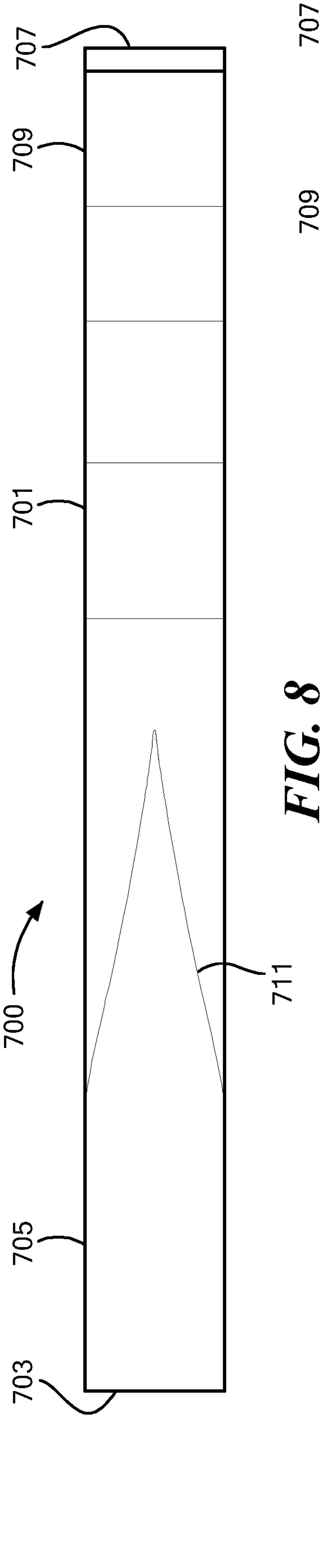
FIG. 8 is a top view of an example embodiment of a 4:1 waveguide-to-waveguide power combiner/divider with E-plane bends in accordance with the concepts described herein.

FIG. 8 is a top view of the example embodiment of the 4:1 waveguide-to-waveguide power combiner/divider 700 of FIG. 7 with E-plane bends in accordance with the concepts described herein.

Figure 9:
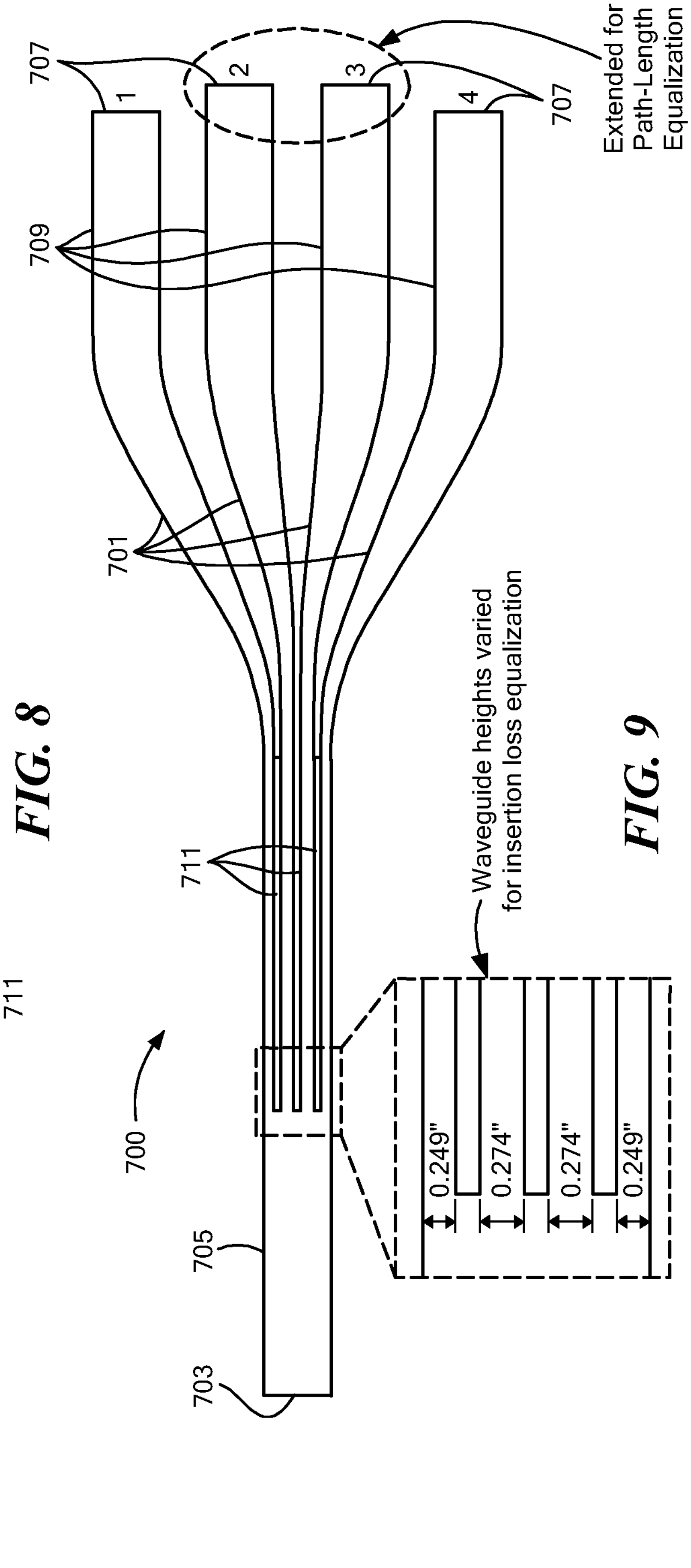
FIG. 9 is a side view of an example embodiment of a 4:1 waveguide-to-waveguide power combiner/divider with E-plane bends in accordance with the concepts described herein.

FIG. 9 is a side view of an example embodiment of the 4:1 waveguide-to-waveguide power combiner/divider 700 of FIG. 7 with E-plane bends 701 in accordance with the concepts described herein.

In an example embodiment, the four sections 709 may have different lengths in order to equalize the pathlengths or for other purposes.

In an example embodiment, the four heights to which the height of the first section 705 is divided by the three walls 711 may be 0.249 inches, 0.274 inches, 0.274 inches, and 0.249 inches, respectively, in order to equalize insertion loss. However, the present disclosure is not limited thereto.

Figure 10:
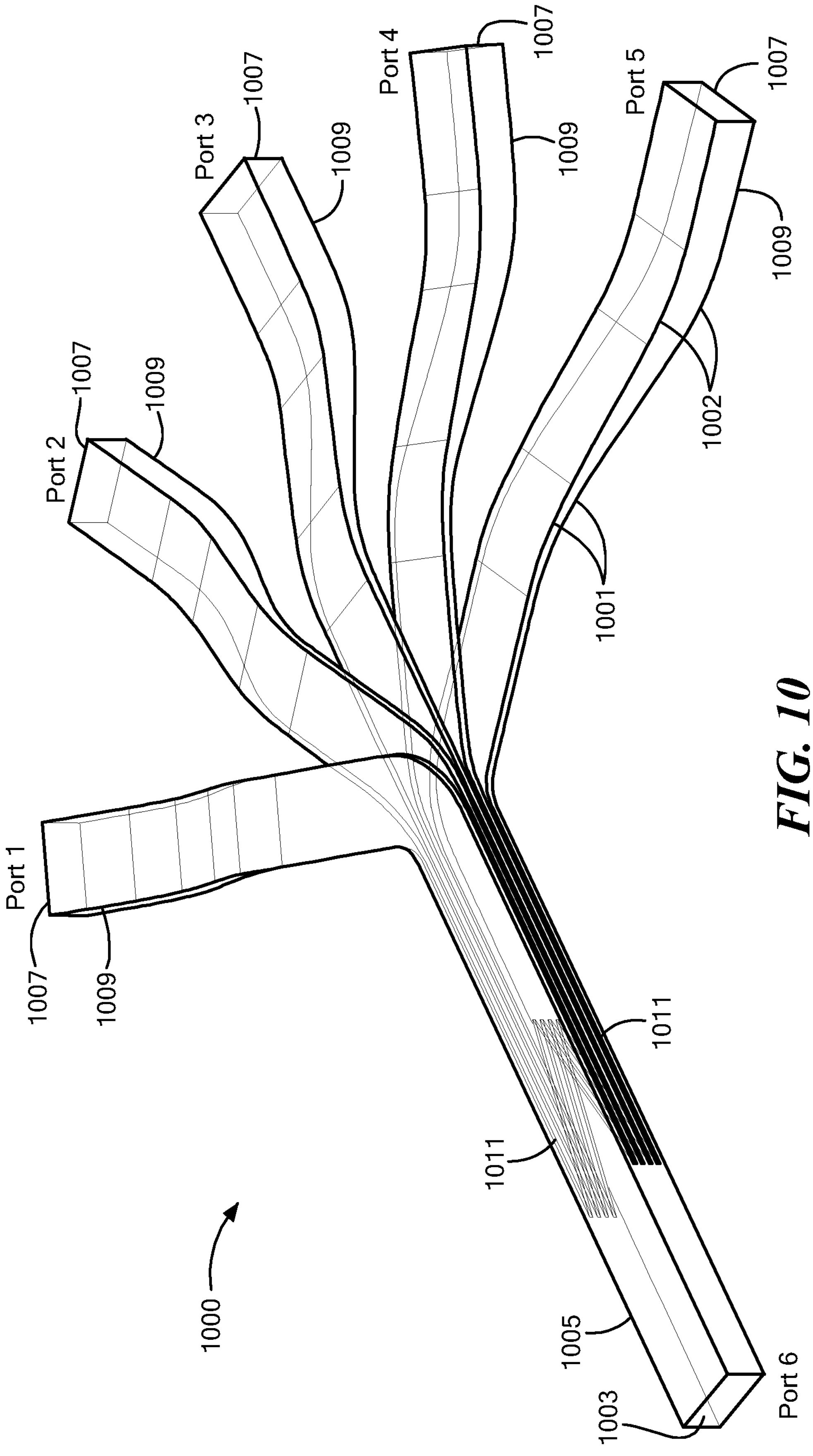
FIG. 10 is a perspective view of an example embodiment of a 5:1 waveguide-to-waveguide power combiner/divider with E-plane bends and H-plane bends in accordance with the concepts described herein.

FIG. 10 is a perspective view of an example embodiment of a 5:1 waveguide-to-waveguide power combiner/divider 1000 with E-plane bends 1001 and H-plane bends 1002 in accordance with the concepts described herein.

In an example embodiment, the 5:1 waveguide-to-waveguide power combiner/divider 1000 has a first opening 1003 at a first end of a first section 1005 of the 5:1 waveguide-to-waveguide power combiner/divider 1000 in a first plane and five openings 1007 of five sections 1009 at five other ends of the 5:1 waveguide-to-waveguide power combiner/divider 1000. However, the present disclosure is not limited to five sections 1009. Any number of sections (e.g., n sections where n is a positive integer) may be used. At least one of the five sections 1009 is bent 1001 in at least one plane different from the plane of the first section 1005 (e.g., an E-plane bend) and bent 1002 in at least yet another different plane (e.g., an H-plane bend). The first section 1005 and the five sections 1009 each have at least two sides that are broader than at least two other sides. Four walls 1011 within the 5:1 waveguide-to-waveguide power combiner/divider 1000 are configured to divide a height of the first section 1005 into five heights, wherein each of the five sections 1009 has a height equal to one of the five heights. The four walls 1011 are located at a junction of the first section 1005 and the five sections 1009 and extend toward the first opening 1003 of the first section 1005.

The 5:1 waveguide-to-waveguide power combiner/divider 1000 shown in FIG. 10 is a rectangular, four-walled conductive container opened at two ends, where two opposing walls are broader than the other two opposing walls. However, the present disclosure is not limited thereto. The 5:1 waveguide-to-waveguide power combiner/divider 1000 may be any suitable shape (e.g., hexagonal, octagonal, etc.), where there are more than two less-broad walls. The 5:1 waveguide-to-waveguide power combiner/divider 1000 is conductive (e.g., metallic or a non-conductive material with a conductive metal deposited on interior surfaces of the waveguide). Metallic waveguides include copper, aluminum, brass, tin, etc.). Non-conductive materials include plastics, polymers, etc.). The length of the 5:1 waveguide-to-waveguide power combiner/divider 1000 from the first opening 1003 to the three openings 1007 may be any suitable length to achieve a desired frequency and bandwidth (e.g., Hz, MHz, GHz, etc.).

In accordance with the concepts described herein, an example 5:1 waveguide-to-waveguide power combiner/divider 1000 may have a polygonal shape comprising one of a rectangular shape, a square shape, a hexagonal shape, an octagonal shape, and any other suitable polygonal shape.

In accordance with the concepts described herein, the four walls 1011 each have a tapered shape comprising one of a rectangular shape, a curved shape, a stair-stepped shape, and any other suitable geometric shape.

In accordance with the concepts described herein, an example tapered shape of each of the four walls 1011 comprises one of tapering toward the first opening 1003 of the first section 1005 and tapering toward the five openings 1007 of the three sections 1009.

In accordance with the concepts described herein, an example 5:1 waveguide-to-waveguide power combiner/divider 1000 and the four walls 1011 are each electrically conductive materials, wherein the electrically conductive materials comprise one of a metal and a non-conductive material having a conductive material deposited on interior surfaces of the waveguide. In an example waveguide, a waveguide has a conductive metal deposited on interior surfaces to form conducting walls of the waveguide. The conducting walls of the waveguide shield interior RF fields from the material used to form the assembly, so any material (conductive or non-conductive) may be used. This is advantageous where weight is an issue and the waveguide does not need to support high average power operation, allowing use of a lightweight material with low thermal conductivity.

In accordance with the concepts described herein, at least one of example five sections 1009 is bent 1001 at least once in an E-plane and bent 1002 at least one in an H-plane. However, the present disclosure is not limited thereto. The bends may be bends in an H-plane.

In accordance with the concepts described herein, the example five heights are one of a same height and different heights (e.g., the heights maybe identical to each other, unique from each other, or any combination there between).

Figure 11:
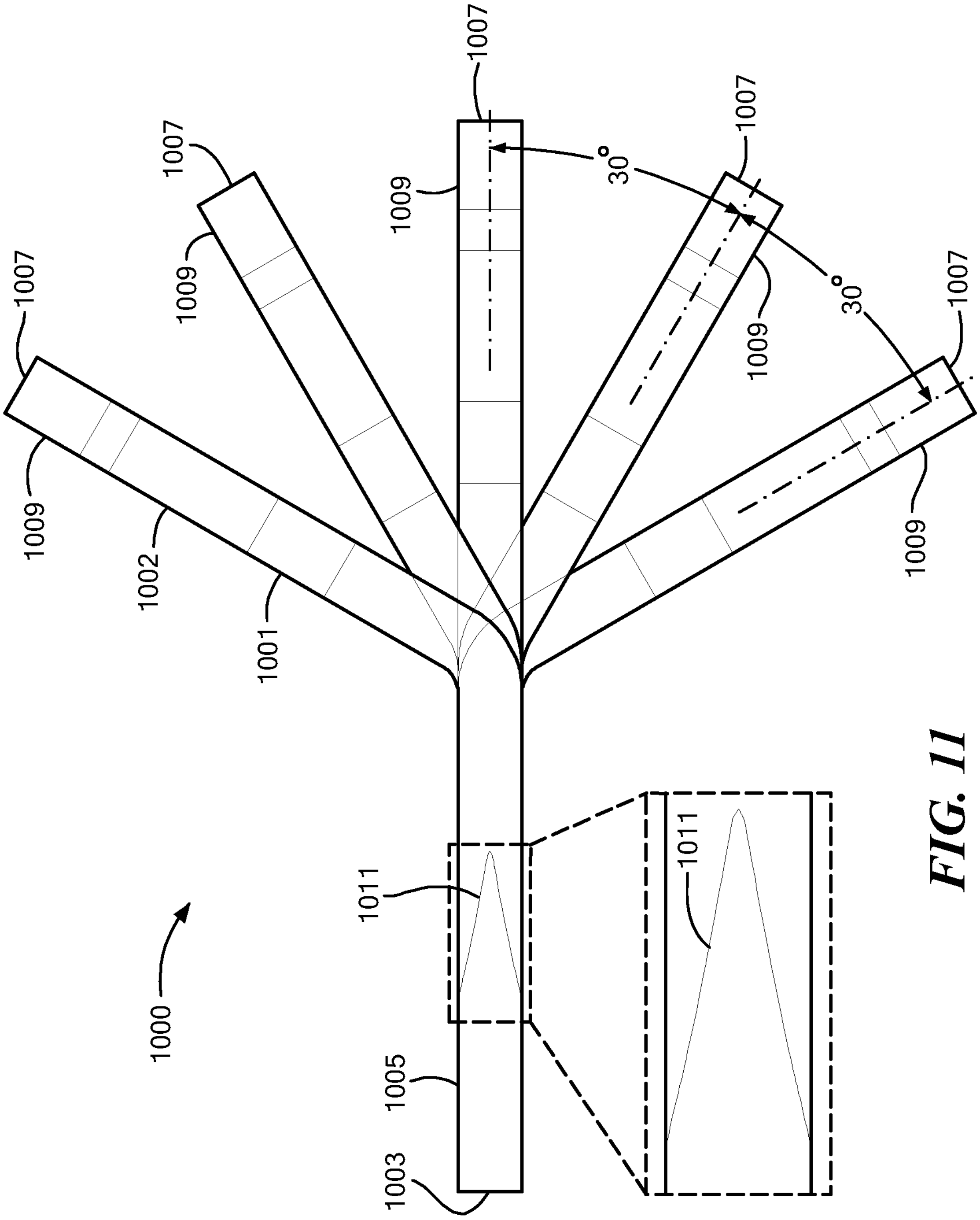
FIG. 11 is a top view of an example embodiment of a 5:1 waveguide-to-waveguide power combiner/divider with E-plane bends and H-plane bends in accordance with the concepts described herein.

FIG. 11 is a top view of an example embodiment of the 5:1 waveguide-to-waveguide power combiner/divider 1000 of FIG. 10 with E-plane bends 1001 and H-plane bends 1002 in accordance with the concepts described herein.

In an example embodiment, at least one of the five sections 1009 may be spaced 30 degrees from an adjacent one of the five sections 1009.

Figure 12:
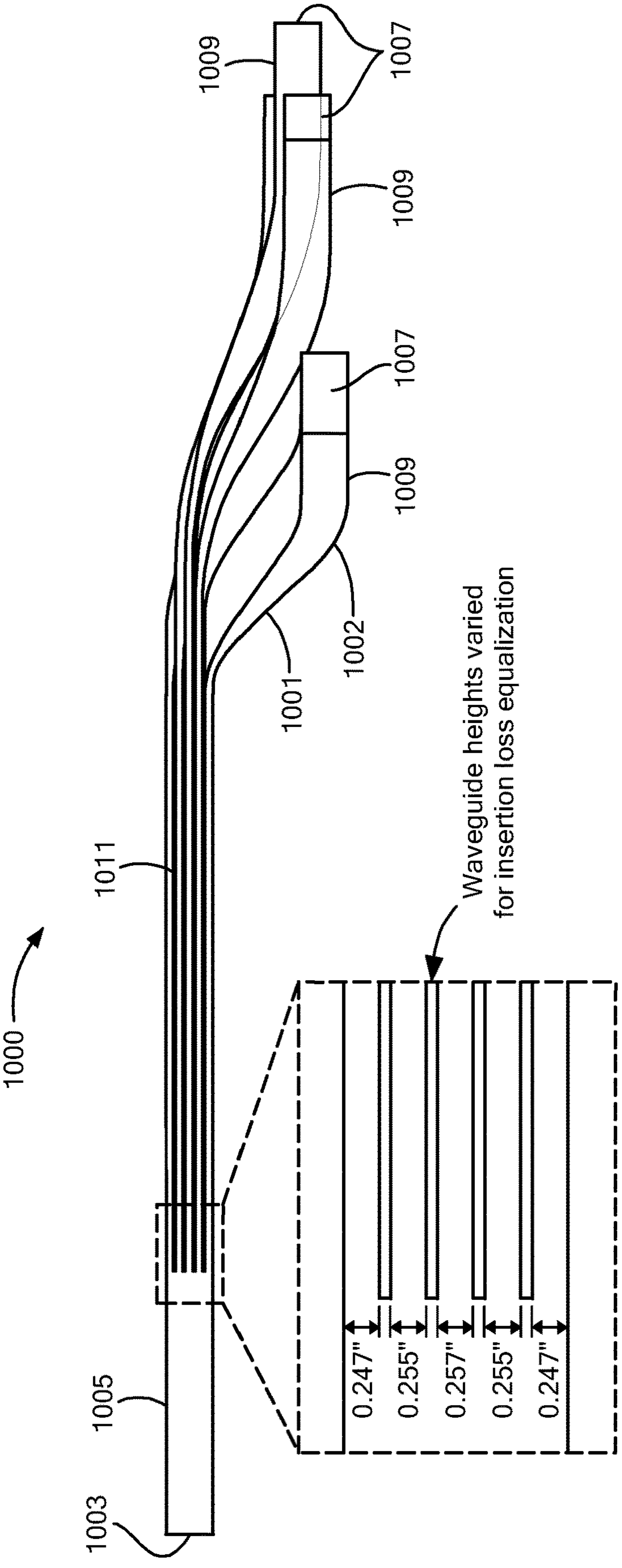
FIG. 12 is a side view of an example embodiment of a 5:1 waveguide-to-waveguide power combiner/divider with E-plane bends and H-plane bends in accordance with the concepts described herein.

FIG. 12 is a side view of an example embodiment of the 5:1 waveguide-to-waveguide power combiner/divider 1000 of FIG. 10 with E-plane bends 1001 and H-plane bends 1002 in accordance with the concepts described herein.

In an example embodiment, the five sections 1009 may have different lengths in order to equalize the pathlengths or for other purposes.

In an example embodiment, the five heights to which the height of the first section 1005 is divided by the four walls 1011 may be 0.247 inches, 0.255 inches, 0.257 inches, 0.255 inches, and 0.247 inches, respectively, in order to equalize insertion loss. However, the present disclosure is not limited thereto.

Figure 13:
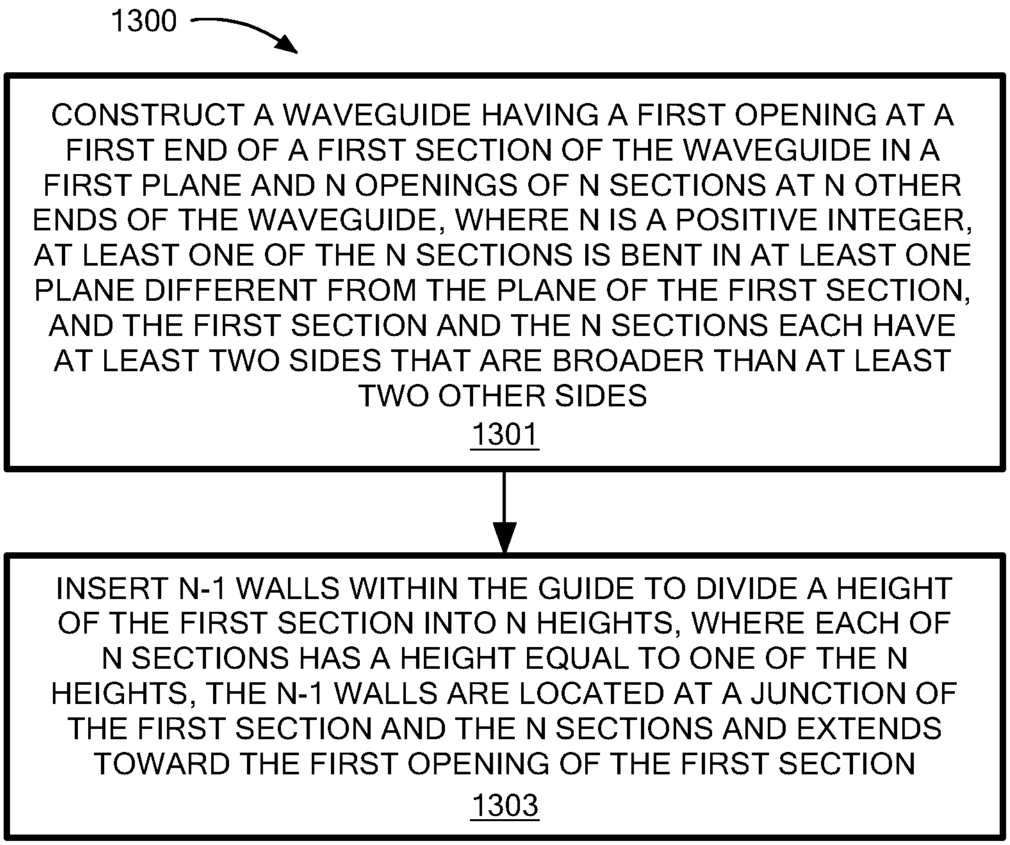
FIG. 13 is a flowchart of an example method of a waveguide-to-waveguide power combiner/divider in accordance with the concepts described herein.

FIG. 13 is a flowchart of an example method 1300 of a waveguide-to-waveguide power combiner/divider in accordance with the concepts described herein.

In an example embodiment, the method 1300 of a waveguide-to-waveguide power combiner/divider comprises constructing a waveguide having a first opening at a first end of a first section of the waveguide in a first plane and n openings of n sections at n other ends of the waveguide, wherein n is a positive integer, wherein at least one of the n sections is bent in at least one plane different from the plane of the first section, and wherein the first section and the n sections each have at least two sides that are broader than at least two other sides in step 1301.

Step 1303 of the method 1300 comprises inserting n−1 walls within the waveguide to divide a height of the first section into n heights, wherein each of the n sections has a height equal to one of the n heights, wherein the n−1 walls are located at a junction of the first section and the n sections and extend toward the first opening of the first section.

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable sub combination. Other embodiments not specifically described herein are also within the scope of the following claims.

Various embodiments of the concepts, systems, devices, structures and techniques sought to be protected are described herein with reference to the related drawings. As noted above, in embodiments, the concepts and features described herein may be embodied in a digital multi-beam beamforming system. Alternative embodiments can be devised without departing from the scope of the concepts, systems, devices, structures and techniques described herein.

It is noted that various connections and positional relationships (e.g., over, below, adjacent, etc.) are set forth between elements in the above description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection".

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description herein, terms such as "upper," "lower," "right," "left," "vertical," "horizontal, "top," "bottom," (to name but a few examples) and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements. Such terms are sometimes referred to as directional or positional terms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways.

Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A waveguide-to-waveguide power combiner/divider, comprising:

a waveguide having a first opening at a first end of a first section of the waveguide in a first plane and n openings of n sections at n other ends of the waveguide, wherein n is a positive integer greater than or equal to three, wherein at least one of the n sections is bent in at least one plane different from the first plane of the first section, and wherein the first section and the n sections each have at least two sides that are broader than at least two other sides; and n−1 walls within the waveguide configured to divide a height of the first section into n heights, wherein each of the n sections has a height equal to one of the n heights, and wherein the n−1 walls are located at a junction of the first section and the n sections and extend toward the first opening of the first section;

wherein a length of at least one of the n sections is extended for path length equalization; and wherein the heights of the n heights vary to provide insertion loss equalization.

2. The waveguide-to-waveguide power combiner/divider of claim 1, wherein the waveguide has a polygonal shape.

3. The waveguide-to-waveguide power combiner/divider of claim 1, wherein each of the n−1 walls has a tapered shape.

4. The waveguide-to-waveguide power combiner/divider of claim 3, wherein the tapered shape of each of the n−1 walls comprises tapering toward the first opening of the first section or tapering toward the n openings of the n sections.

5. The waveguide-to-waveguide power combiner/divider of claim 1, wherein the waveguide and the n−1 walls comprise one or more electrically conductive materials.

6. The waveguide-to-waveguide power combiner/divider of claim 5, wherein the one or more electrically conductive materials of each of the waveguide and the n−1 walls comprise:

a metal deposited on interior surfaces of the waveguide; or a conductive material deposited with a non-conductive material on the interior surfaces of the waveguide.

7. The waveguide-to-waveguide power combiner/divider of claim 1, wherein the at least one of the n sections is bent at least once in an E-plane.

8. The waveguide-to-waveguide power combiner/divider of claim 1, wherein the at least one of the n sections is bent at least once in an H-plane.

9. A waveguide-to-waveguide power combiner/divider, comprising:

a waveguide having a first opening at a first end of a first section of the waveguide in a first plane and n openings of n sections at n other ends of the waveguide, wherein n is a positive integer, wherein at least one of the n sections is bent in at least one plane different from the first plane of the first section, and wherein the first section and the n sections each have at least two sides that are broader than at least two other sides; and n−1 walls within the waveguide configured to divide a height of the first section into n heights, wherein each of the n sections has a height equal to one of the n heights, and wherein the n−1 walls are located at a junction of the first section and the n sections and extend toward the first opening of the first section;

wherein the at least one of the n sections is bent at least once into compound bends comprising at least one bend in both an E-plane and an H-plane.

10. The waveguide-to-waveguide power combiner/divider of claim 1, wherein the n heights are a combination of n heights, at least two of which are identical and at least two of which are different.

11. A method of a waveguide-to-waveguide power combiner/divider, comprising:

constructing a waveguide having a first opening at a first end of a first section of the waveguide in a first plane and n openings of n sections at n other ends of the waveguide, wherein n is a positive integer greater than or equal to three, wherein at least one of the n sections is bent in at least one plane different from the first plane of the first section, and wherein the first section and the n sections each have at least two sides that are broader than at least two other sides; and inserting n−1 walls within the waveguide to divide a height of the first section into n heights, wherein each of the n sections has a height equal to one of the n heights, and wherein the n−1 walls are located at a junction of the first section and the n sections and extend toward the first opening of the first section;

wherein a length of at least one of the n sections is extended for path length equalization; and wherein the heights of the n heights vary to provide insertion loss equalization.

12. The method of claim 11, wherein the waveguide has a polygonal shape.

13. The method of claim 11, wherein each of the n−1 walls has a tapered shape.

14. The method of claim 13, wherein the tapered shape of each of the n−1 walls comprises tapering toward the first opening of the first section or tapering toward the n openings of the n sections.

15. The method of claim 11, wherein the waveguide and the n−1 walls comprise one or more electrically conductive materials.

16. The method of claim 15, wherein the one or more electrically conductive materials of each of the waveguide and the n−1 walls comprise:

a metal deposited on interior surfaces of the waveguide; or a conductive material deposited with a non-conductive material on the interior surfaces of the waveguide.

17. The method of claim 11, wherein the at least one of the n sections is bent at least once in an E-plane.

18. The method of claim 11, wherein the at least one of the n sections is bent at least once in an H-plane.

19. The method of claim 11, wherein the at least one of the n sections is bent at least once into compound bends comprising at least one bend in both an E-plane and an H-plane.

20. The method of claim 11, wherein the n heights are a combination of n heights, at least two of which are identical and at least two of which are different.

* * * * *